Patented July 9, 1940

2,207,185

UNITED STATES PATENT OFFICE 2,207,185

PREPARATION OF INSECTICIDAL MATERIALS FROM ALKALOIDS AND PECTIC ACID

Clarence Walter Wilson, Norco, Calif., assignor to California Fruit Growers Exchange, Los Angeles, Calif., a corporation of California No Drawing. Application July 9, 1938,
Serial No. 218,362

9 Claims. (Cl. 260—210)

This invention relates, in general, to a method for the preparation of insecticidal materials, and in particular to a method of preparing insecticidal materials, and in particular to a method of preparing insecticidal materials wherein the reaction of the materials is carried on while they are in a sensibly dry condition. This invention still further relates to a method of preparing insecticidal materials comprising the combination of pectic acid and a volatile poisonous alkaloid.

Insecticides may be divided generally into two classes, those which exert their insecticidal properties by internal activity or toxicity, as by passage through the oral cavity of the insect, and those which exert their insecticidal properties by external contact or by entering the respiratory tract. This invention is directed toward a method for the preparation of an insecticidal material particularly adapted for use in exterminating chewing insects.

It has been suggested that insecticides for use in the control of chewing insects might be made by combining nicotine with various materials of vegetable origin, as, for example, tannic acid. These substances, while useful for the control of chewing insects have the disadvantage of being comparatively difficult and expensive to prepare in a dry powdered form, since these materials are prepared by dissolving the reacting ingredients in water and subsequently evaporating the moisture therefrom to a dry product and grinding the same. The resulting dry preparations are not only difficult to grind, but some loss is unavoidable at this stage. Losses occurring at this stage are not only undesirable from an economic standpoint, but in addition it is found that the presence of dry powdered alkaloidal insecticides in the atmosphere is extremely annoying and dangerous to individuals operating the process. It has become the practice, therefore, when using such materials as, for example, nicotine alkaloid and tannic acid to react these materials in an aqueous phase just prior to use. However, there arises from this practice many conditions under which it is not always desirable to operate.

The present invention is based, therefore, upon the discovery that it is possible to prepare a substantially dry powdered alkaloidal insecticide comprising the combination of a volatile poisonous alkaloid and pectic acid in a manner heretofore not thought possible in the preparation of alkaloidal insecticides with materials of plant origin. This invention is further based upon the discovery that it is possible to prepare an insecticidal material of this type wherein the pectic acid as it enters into the reaction contains only such an amount of moisture that it still feels dry to the touch.

This invention is still further based upon the fact that it is now possible to prepare dry powdered poisonous alkaloidal insecticides by a process whch does not necessarily contemplate the powdering of the reaction product, thereby eliminating the attendant losses as well as physiological hazards to the operators.

Accordingly an object of this invention is to disclose methods and means for the preparation of insecticidal materials comprising the combination of a volatile poisonous alkaloid with materials of vegetable origin.

Another object of this invention is to disclose methods and means for the preparation of an insecticidal material comprising the combination of a volatile poisonous alkaloid and pectic acid.

A still further object of this invention is to disclose methods and means for the preparation of an insecticidal material comprising the combination of a volatile poisonous alkaloid and a powdered vegetable material in condition wherein it contains moisture but only in such amount as to remain dry to the touch.

A further object of this invention is to disclose methods and means for the preparation of an insecticidal material comprising reacting powdered pectic acid with a volatile poisonous alkaloid under such conditions that the resulting product need not be powdered prior to use.

Other objects, uses, and adaptations of this invention will be apparent from an illustration of the invention hereinafter described.

The materials preferably used in accordance with this invention are pectic acid and nicotine alkaloid or coniine alkaloid or other volatile poisonous alkaloids.

Pectic acid from any suitable source may be employed. I have found it preferable, however, to use pectic acid as prepared in accordance with the disclosures in my U. S. Patent No. 2,132,065, issued October 4, 1938, and corresponding British Patent No. 472,974, of October 1, 1937.

For the purpose of illustration, the invention will be described as applied to a method for the preparation of an insecticidal material containing pectic acid and nicotine alkaloid in the proportion of up to 55 per cent nicotine based on the anhydrous weight of the pectic acid taken. Although alkali salts or alkaline earth salts of pectic acid may be used as source materials for the pectate radical, I have found it desirable to use pectic acid in place of the alkali or alkaline earth salts of pectic acid since the step of removing the cation of the pectate is thereby eliminated. It is to be understood that the description given hereinafter and relating to an insecticide of this type, is given for illustrative purposes only, since it represents a suitable product.

The moisture content of a desired quantity of dry powdered commercial pectic acid is adjusted to between 25 and 35 per cent, but preferably about 30 per cent by the addition of water. After complete absorption of the added moisture the pectic acid will be found to be still in its original state of powdered subdivision. Moreover, it will be dry to the touch. This condition is referred to herein as being sensibly dry. At this point about 50 per cent nicotine alkaloid (calculated on the anhydrous weight of the pectic acid taken) is thoroughly stirred into the pectic acid. This mixture is allowed to stand for about twenty-four hours or until the reaction is complete as evidenced by only a slight odor of nicotine remaining. At the end of the reaction period the product resulting from the above process will be found to be in a condition suitable for use after drying without the need for grinding although it may be desirable to break up any lumps which may have formed, as, for example, by screening.

Coniine alkaloid, another well known volatile poisonous alkaloid, may, if desired, be substituted for nicotine alkaloid or it may be desirable to use some other volatile poisonous alkaloid. It is to be noted that the synthetic volatile poisonous alkaloidal materials, such as synethtic nicotine, may be substituted for the natural products. When, for example, a pectate of nicotine is used as a dust, a satisfactory material may be obtained by mixing about 5 per cent of the nicotine compound with 95 per cent kaolin. On the other hand, if one wishes to employ the material as a spray, a suitable water dispersion of the nicotine compound may be prepared. In such cases I have found it is desirable to add a very slight amount of a wetting agent, such as butyl diphenyl sodium sulfonate, sold commercially under the trade name "Aresket." This wetting agent may be used in dilutions of 1 part of Aresket to 2000 parts of the spray. Other wetting agents may be used for this purpose in accordance with the usual practices. In some cases it may be necessary to use lower dilutions to produce good wetting and spreading on the foliage.

As stated hereinabove, it is to be understood that this invention is not limited to the particular illustrations. Under some circumstances variations in the proportions of my insecticide may be necessary when used as a spray or dust, depending on the toxcity required to kill the particular parasite for which the spray or dust is being used.

Having thus described my invention in such clear, concise, and exact terms as to enable others skilled in the art to make, compound, and use the same, I claim as my invention and desire to obtain by Letters Patent, the following:

I claim:

1. A process for the preparation of an insecticidal material comprising reacting nicotine alkaloid and pectic acid in the presence of moisture in an amount of about 25 to 35 per cent based on the weight of pectic acid plus moisture.

2. The process of preparing an insecticidal material comprising reacting pectic acid and nicotine alkaloid in the proportion of about 1 part nicotine to about 2 parts of pectic acid in the presence of about 1 part of water.

3. A process for the preparation of an insecticidal material comprising reacting a volatile poisonous alkaloid with pectic acid, the pectic acid containing moisture but being still in a sensibly dry condition.

4. A process for the preparation of an insecticidal material comprising reacting a volatile poisonous alkaloid and pectic acid, the pectic acid containing moisture but being still in a sensibly dry condition, stirring the mixture until such reaction is near completion and finally drying and screening the resulting product.

5. A process for the preparation of an insecticidal material comprising reacting nicotine alkaloid with pectic acid, the pectic acid containing moisture but being still in a sensibly dry condition.

6. A process for the preparation of an insecticidal material comprising reacting coniine alkaload and pectic acid in the presence of moisture in an amount of about 25 to 35 per cent based on the weight of pectic acid plus moisture.

7. A process for the preparation of an insecticidal material comprising reacting coniine alkaload with pectic acid, the pectic acid containing moisture but being still in a sensibly dry condition.

8. A process for the preparation of an insecticidal material comprising reacting a volatile poisonous alkaloid with powdered pectic acid, the pectic acid containing moisture but being still powdered and in a sensibly dry condition.

9. A process for the preparation of an insecticidal material comprising reacting a volatile poisonous alkaloid with powdered pectic acid, the pectic acid containing moisture in an amount of about 25 to 35 per cent based on the weight of pectic acid plus moisture.

CLARENCE WALTER WILSON.